May 11, 1954
E. S. GANDRUD
2,678,216
SIDE DRESSING ATTACHMENT FOR FERTILIZER
SPREADERS, SEEDERS, AND THE LIKE
Filed June 12, 1952
2 Sheets-Sheet 1
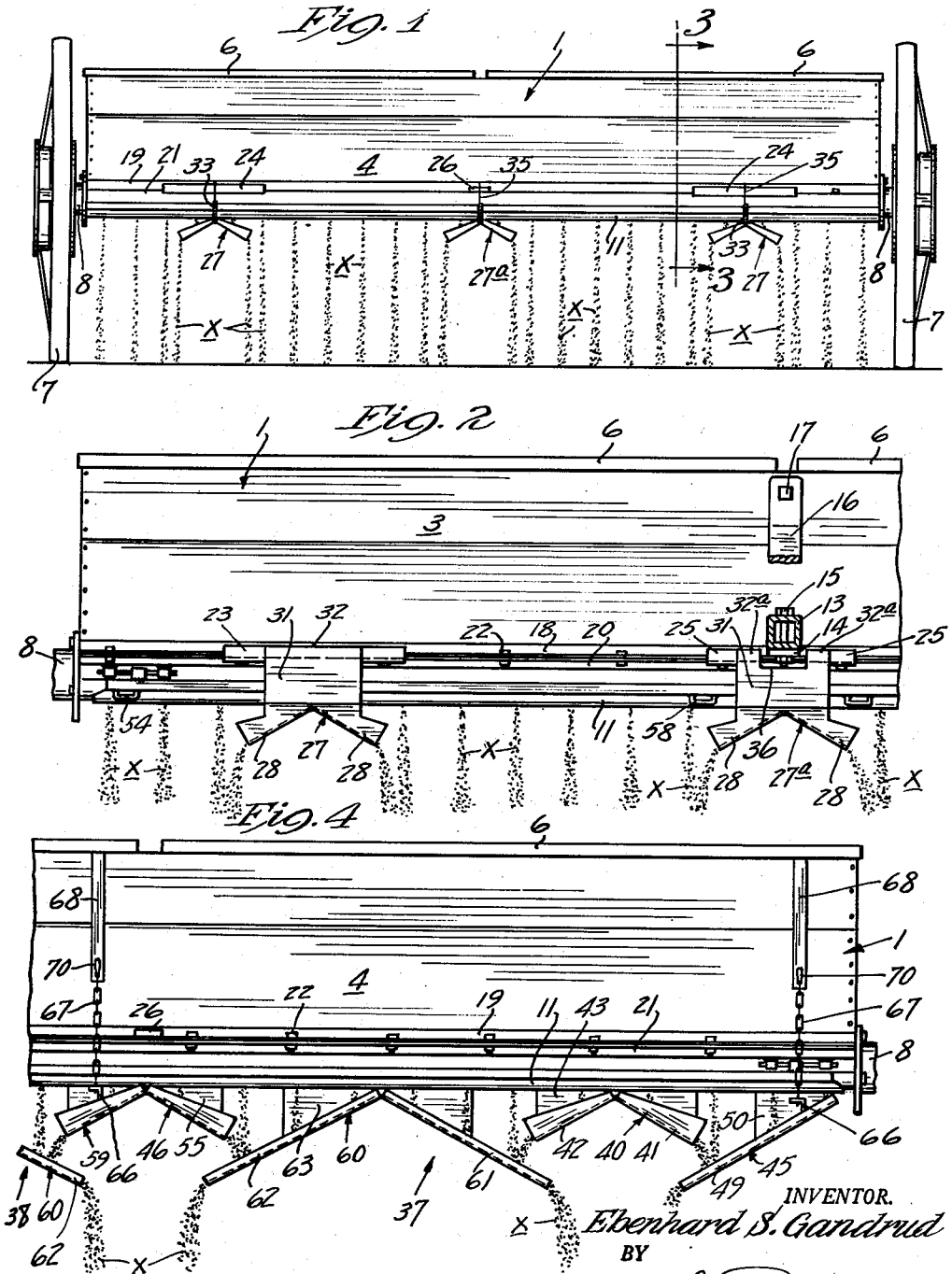
INVENTOR.
Ebenhard S. Gandrud
BY
Merchant & Merchant
ATTORNEYS

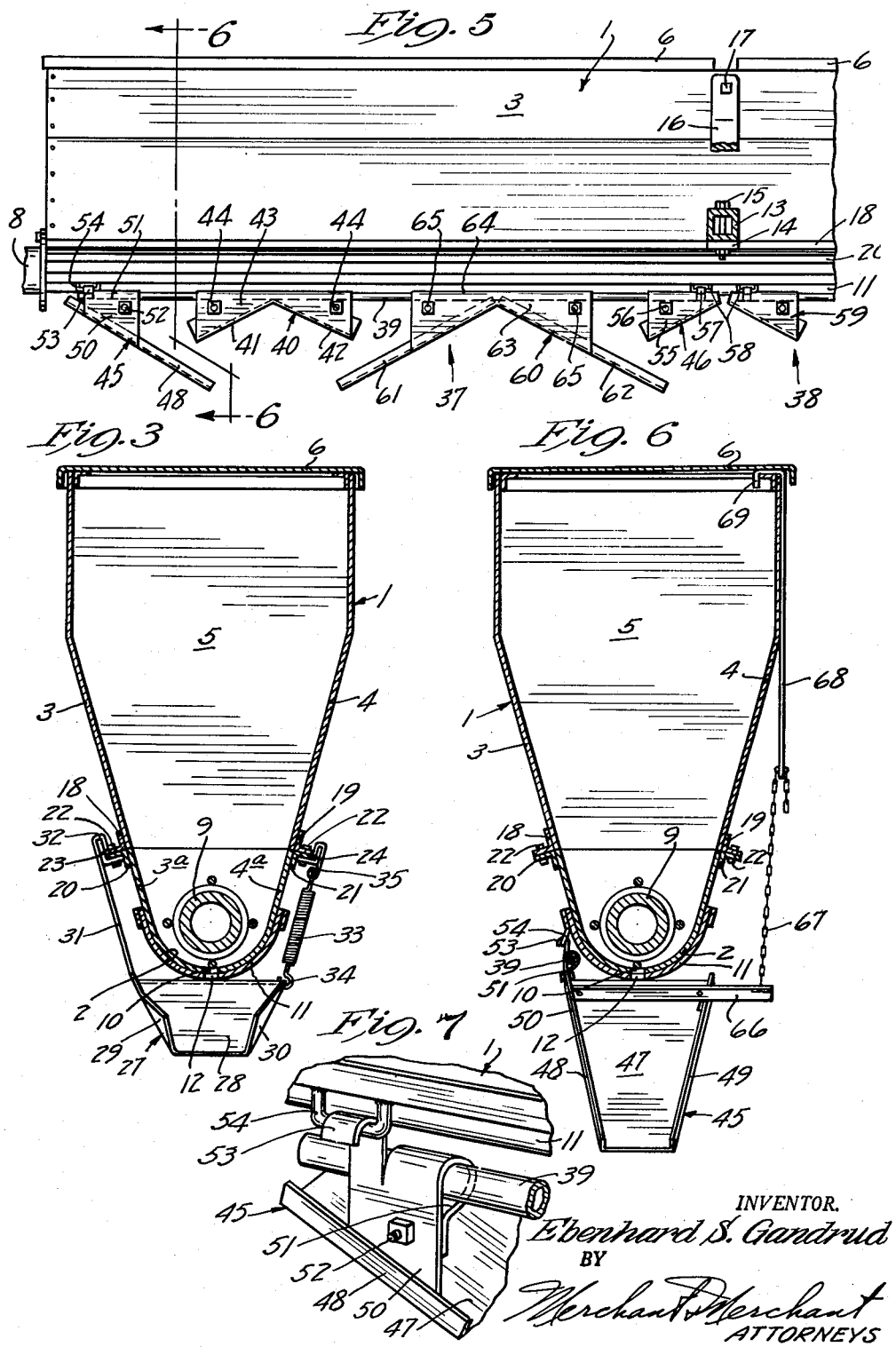

Patented May 11, 1954

2,678,216

UNITED STATES PATENT OFFICE 2,678,216

SIDE DRESSING ATTACHMENT FOR FERTILIZER SPREADERS, SEEDERS, AND THE LIKE

Ebenhard S. Gandrud, Owatonna, Minn.

Application June 12, 1952, Serial No. 293,148

5 Claims. (Cl. 275—14)

My invention relates generally to devices for broadcasting fertilizer, seeds and the like, and more particularly to improvements in or attachments for fertilizer spreaders of the type disclosed in my prior United States Letters Patent 2,350,107.

More specifically, my invention is in the nature of a side dressing attachment for spreaders of the above type whereby fertilizers may be discharged upon the ground closely adjacent either side of a crop row.

An important object of my invention is the provision of a side dressing attachment for fertilizer spreaders which is quickly and easily adjustable to accommodate rows of different widths.

Another object of my invention is the provision of a side dressing attachment as set forth which is easily attached to or removed from a fertilizer spreader.

Still another object of my invention is the provision of a side dressing attachment which is simple and inexpensive to manufacture, which is efficient in operation, and which is rugged in construction and durable in use.

The above and still further highly important objects and advantages of my invention become apparent from the following detailed specification, appended claims and attached drawings.

Referring to the drawings which illustrate the invention and in which like characters indicate like parts throughout the several views:

Fig. 1 is a view in rear elevation of a fertilizer spreader incorporating a preferred embodiment of my invention;

Fig. 2 is an enlarged fragmentary view in full elevation of the machine of Fig. 1, some parts broken away and some parts being shown in section;

Fig. 3 is an enlarged transverse section taken substantially on the line 3—3 of Fig. 1;

Fig. 4 is a view similar to Fig. 1 but showing a modified form of the invention;

Fig. 5 is a view corresponding to Fig. 2 but showing the modification of Fig. 4;

Fig. 6 is an enlarged transverse section taken substantially on the line 6—6 of Fig. 5; and Fig. 7 is an enlarged fragmentary detailed view in perspective of the attachment of Figs. 4-6 inclusive.

With reference to the preferred embodiment of the invention illustrated in Figs. 1-3 inclusive, a fertilizer spreader is shown as comprising an elongated hopper 1 which is preferably formed from sheet metal and which is formed with a concave or cylindrical bottom 2, front and rear walls 3 and 4, respectively, and end walls 5, one of which is shown, see Fig. 3. As further shown in Fig. 3, the front and rear walls 3 and 4 converge downwardly toward the cross-sectionally arcuate bottom wall 2. The open top of the hopper 1 is preferably normally covered by a pair of closures 6.

The hopper 1 is supported by a pair of ground wheels 7 which are secured to aligned axle shafts not shown, but which are journalled in bearings or trunnions 8 at opposite ends of the hopper 1. Said axle shafts may be assumed to be coupled to an agitator shaft 9 extending longitudinally of the hopper 1 and carried thereby in overlying relationship to the bottom 2 thereof.

The bottom 2 of the hopper is provided with a plurality of longitudinally spaced discharge apertures 10 through which fertilizer, indicated at x, in Figs. 1 and 2 may flow to the ground. A valve acting gate 11 is mounted for longitudinal sliding movements on the hopper 1 and is formed to closely embrace the concave or arcuate bottom 2 thereof. The gate 11 is provided with a plurality of longitudinally spaced apertures 12 which correspond in size and spacing to the discharge openings 10 in the hopper bottom 2. The spacing of the openings 10 in the hopper bottom 2 and that of the apertures 12 in the valve acting gate 11 is such that the longitudinal movements of the gate 11 will cause the apertures 12 therein to be moved into and out of alignment with the discharge openings 10 so that the flow of granular material x therethrough may be regulated to a fine degree or shut off altogether.

A draw bar 13 is detachably secured to an anchoring lug 14 on the hopper 1 by means of a nut equipped bolt or the like 15 and is provided with a brace member 16 that is secured to the upper portion of the front wall 3 by a bolt or the like 17, see Fig. 2.

The above described device is clearly shown and described in detail in my prior United States patent above identified. Hence, for the sake of brevity, detailed showing and description herein is omitted.

With reference to Fig. 3, it will be seen that the front and rear walls 3 and 4 respectively of the hopper 1 include separate lower portions 3a and 4a respectively that are integrally formed with the arcuate bottom walls 2 and have their upper longitudinal edges in abutting relationship with the lower longitudinal edges of the respective hopper walls 3 and 4. The upper portion of the hopper is provided with a pair of longitudinally extending front and rear angle irons 18 and 19 respectively that are welded or otherwise rigidly secured thereto. Welded to the upper edges of the wall portions 3a and 4a are longitudinally extended angle irons 20 and 21 respectively that are detachably secured to their respective angle irons 18 and 19 by nut equipped bolts or the like 22. A pair of upwardly projecting front and rear supporting flanges 23 and 24 respectively, preferably made from angle iron or the like, are rigidly secured to respective angle irons 20 and 21 in longitudinally spaced relationship. The supporting flanges 24 are spaced inwardly from the opposite ends of the hopper 1 the same distance as the supporting flanges 23. At the longitudinal center of the hopper on either side of the draw bar anchoring lug 14 is a pair of relatively short supporting flanges 25 similar to the supporting flanges 23 and 24. A supporting lug 26 extends rearwardly outwardly from the angle iron 19 directly behind the lug 14, see Fig. 1.

Supported by the several supporting flanges 23 and 24 are inverted generally V-shaped side dressing troughs 27 which comprise chute elements 28 that slope downwardly from the center of their respective troughs to the open opposite ends thereof. Each of the troughs 27 is formed to provide side walls 29 and 30 the former of which is provided with a central upstanding portion 31 which terminates in a downwardly opening hook element 32 which hooks over and is supported by a cooperating supporting flange 23. Means for supporting the opposite side of each trough 27 comprises a coil tension spring 33 which is formed at its lower end with a hook 34 that extends through an aperture, not shown, in the central portion of the trough 27 adjacent its rear side. At its upper end, each spring 33 is secured to a hook element 35 which hooks over a cooperating supporting flange 24, see Figs. 1 and 3. The central side dressing trough, indicated at 27a is identical to the troughs 27 except that the extended side portion 31 thereof is cut away to provide a central notch 36 which affords clearance for the draw bar mounted lug 14 and which defines the inner side edges of a pair of spaced hook elements 32a that engage the relatively short supporting flanges 25. The hook element 35 of the trough 27a extends through a suitable aperture, not shown, in the supporting lug 26.

The above described mounting element for the several troughs 27 and 27a permits adjustable positioning of the troughs 27 longitudinally of the hopper or, in other words, transversely of the direction of travel of the spreader device. By reference to Figs. 1 and 2 it will be seen that the troughs 27 and 27a are of a length to overlie a plurality of the discharge openings in the hopper bottom 2 and the valve acting gate 11. When it is desired to side dress a field of growing row crops, the fertilizer spreader is positioned so that the central trough 27a overlies a given crop row, and the troughs 27 are adjusted longitudinally of the hopper 1 whereby to overlie the adjacent crop rows. The valve acting gate 11 is manipulated to cause discharge of the powder or granular fertilizer x as the machine is pulled through the field by suitable means such as a tractor or the like. Fertilizer falling upon the chute elements 28 is diverted thereby so that the same falls upon the ground adjacent opposite sides of the crop row underlying each trough. With this arrangement it will be seen that there will be a heavier concentration of the fertilizer closely adjacent the crop row than in the space between said rows. Thus the roots of the growing plants receive a greater amount of fertilizer or plant food while the roots thereof are relatively short while the ground between the rows receives a lesser amount of the fertilizer. The troughs 27 and 27a further prevent the fertilizer x from dropping upon the leaves of the growing plants thus preventing the same from being burned or otherwise damaged by direct contact with the fertilizer material.

In order to concentrate the entire amount of fertilizer x discharged from the hopper 1 closely adjacent opposite sides of each crop row, I provide a modified arrangement shown in Figs. 4–7 inclusive, wherein side dressing troughs having a plurality of chute elements underlie all of the discharge passages of the hopper and valve acting gate. In this form of the invention, the fertilizer spreader is identical to that of Figs. 1–3 inclusive, parts thereof corresponding to those of Figs. 1–3 inclusive, bearing like character references. The side dressing attachment of Figs. 4–7 inclusive is in the nature of a pair of unitary structures 37 and 38 which are identical with the exception that one is right hand and the other is left hand. In the drawings the unit 37 is shown in its entirety, whereas the unit 38 is shown only fragmentarily. The unitary structure 37 comprises a relatively rigid bar 39 which extends longitudinally of the hopper adjacent one side of the bottom portion thereof and to which is mounted an inverted generally V-shaped trough 40 that is formed to provide a pair of chutes 41 and 42 which slope downwardly toward their outer open ends. One side 43 of the trough 40 extends upwardly and loops over the bar 39 being releasably clamped thereto by means of nut equipped bolts or the like 44. At the opposite end portions of the bar 39 are chute elements 45 and 46 which slope downwardly toward each other transversely of the direction of travel of the machine. The chute 45 is in the nature of an open ended channel having a bottom wall 47 and side flanges 48 and 49 to the former of which is welded or otherwise secured an upstanding flange 50 which is formed to provide at its upper end a closed loop 51 which embraces the mounting bar 39. The looped portion 51 is clamped about the bar 39 by means of a nut equipped clamping screw or the like 52, the loosening of which will permit the chute element 45 to be adjustably movable longitudinally of the bar 39. With reference to Figs. 4 and 5 it will be seen that the lower discharge end portion of the chute element 45 underlies the lower discharge end of the chute 41 of the trough 40 for a purpose which will hereinafter become apparent. A portion of the upstanding flange 50 is formed to provide a downwardly opening hook 53 which is adapted to be inserted through and depend from a hanger member 54 rigidly secured to the valve acting gate 11, see Figs. 5–7 inclusive.

The chute element 46 has one side 55 thereof extending upwardly and, for the most part, loops over the opposite end portion of the mounting bar 39. The chute element 46 is provided with a nut equipped clamping screw 56 by means of which the chute element 46 is frictionally locked to the supporting bar 39 against accidental longitudinal movement thereon. A portion of the upstanding side 55 is formed to provide an outwardly and downwardly opening hook 57 which is received and supported by a second hanger member or loop 58 welded or otherwise secured to the valve acting gate 11. With reference to Figs.

4 and 5 it will be seen that the chute element 46 and a similar chute element 59 cooperate to provide halves of an inverted V-shaped trough similar to the trough 40. In other words, the chute element 46 is substantially equal in size and shape to the chute element 41 of the trough 40. A secondary inverted V-shaped trough 60 comprises a pair of chute elements 61 and 62 which slope downwardly toward their outer open ends, and an upstanding flange 63 the upper end 64 of which is looped over the mounting bar 39 and which is securely clamped thereto by nut equipped screws or the like 65. The lower discharge end of the chute element 61 underlies the discharge end portion of the chute element 42 whereas the lower open end of the chute 62 of the structure 37 underlies the discharge end of the chute element 46. Thus the unitary structure 37 includes the chutes 41 and 42 of the trough 40, the chute elements 45 and 46, and the chute elements 61 and 62 of the trough 60 between the chute elements 42 and 46, said unitary structure 37 receiving and delivering material discharged from one half of the hopper 1, the structure 38 receiving and delivering material discharged from the other half of the hopper 1.

From the above it should be obvious that one side of the unitary side dressing structure 37 is mounted on the hopper 1 by engagement of the hooks 53 and 57 with their respective hanger members 54. The structure 37 is supported from the rear side of the hopper 1 by means of a rigid arm 66 that is anchored to the chute element 45 and which projects rearwardly therefrom and to the outer end of which is secured one end of a link chain 67. A metallic strap or bar 68 is provided at its upper end with a downwardly opening hook 69 which engages the upper edge of the rear wall 4 of the hopper. The strap 68 is provided adjacent its lower end with a keyhole slot 70 that is adapted to receive the free end portion of the link chain 67, whereby to provide an adjustable length suspension device for the rear side of the structure 37.

As above indicated, the structure 38 is similar to the structure 37 and comprises similar components such as the secondary inverted V-shaped trough 60 the chute element 62 of which is shown fragmentarily in Fig. 4. The structure 38 is mounted to the hopper in the same manner as is the structure 37 except that the rigid arm 66 of the structure 38 is secured to the chute element 59 and extends rearwardly with respect thereto. However, if desired, the arm 66 associated with the unitary structure 38 may be secured to and extend rearwardly from the chute element at the opposite end of the structure. The chute elements 48 and 61 discharge fertilizer or granular plant foods received from the hopper adjacent opposite sides of one crop row whereas the converging chute element 62 of the unitary structures 37 and 38 discharge fertilizers adjacent opposite sides of a second crop row. Inasmuch as the structures 37 and 38 comprise similar component parts, it may be assumed that a third crop row is side dressed by chute elements not shown but similar to the cooperating chute elements 48 and 61. With this arrangement all of the fertilizer discharged from the hopper 1 is concentrated upon the ground closely adjacent the crop row, and no fertilizer is deposited elsewhere between the crop rows. In some instances this concentration is more desirable whereas in other cases it is desirable to also deposit fertilizer between the crops rows as well as a portion concentrated closely adjacent opposite sides of said rows.

Both forms of the invention illustrated are easily applied to or removed from the hopper 1. When it is desired to utilize the attachments of Figs. 1-3 inclusive it is but necessary to first engage the flanges 23 and 25 with the hook portions 32 and 32a of the troughs 26 and 27a respectively and thereafter apply the hooks 35 to the flanges 24 and the supporting lug 26 as the case may be. Removal of these troughs is obviously performed in the reverse manner. Likewise, applying the unitary structures 37 and 38 to the hopper merely involves inserting the hooks 53 and 57 through their respective hanger members or loops 54 and 58 after which the free ends of the chains 67 are inserted through the keyhole slots 70 and the rear side of the structures elevated into position. When one of the links of a chain 67 is received in the lower smaller end of the keyhole slot 70, the chain will be prevented from slipping through the slot 70.

My invention has been thoroughly tested and found to be completely fit for the accomplishment of the objectives set forth: and while I have shown and described two commercial forms of my novel structure it will be understood that the same is capable of further modification without departure from the spirit and scope of the invention as defined in the claims.

What I claim is:

1. A row crop side dressing attachment for fertilizer spreaders of the type including an elongated hopper extending transversely of the direction of travel and having a plurality of longitudinally spaced discharge openings in its bottom portion, said attachment comprising an open ended inverted generally V-shaped trough the legs of which provide chutes extending generally longitudinally of the hopper, the bottoms of said chutes sloping downwardly and outwardly in a vertical plane along the longitudinal dimension of the hopper from the center of the trough to its opposite ends, a pair of downwardly converging chute elements disposed in spaced relationship longitudinally of the hopper, the lower ends of said chute elements each underlying opposite lower open end portions of said trough whereby to receive material therefrom, said chute elements being of a length and positioned to each receive material discharged from a plurality of said openings longitudinally outwardly of said trough, rigid means interconnecting said trough and chute elements to provide a unitary structure, and means for detachably anchoring said unitary structure to the hopper, said last-mentioned means comprising a rigid anchoring member on one side of said structure and an extensible and retractable anchoring member on the opposite side of said structure, each of said anchoring members being engageable with cooperating portions of an opposite side of the hopper and slidable with respect thereto in opposite directions longitudinally of the hopper.

2. A row crop side dressing attachment for fertilizer spreaders of the type including an elongated hopper extending transversely of the direction of travel and having a plurality of longitudinally spaced discharge openings in its bottom portion, said attachment comprising a plurality of open ended inverted generally V-shaped troughs in spaced relation longitudinally of the hopper, the legs of said troughs providing chutes extending generally longitudinally of the hopper and sloping downwardly and outwardly in a vertical plane along the longitudinal dimension of the hopper toward their outer open ends, a plurality of pairs of downwardly converging chute elements disposed in spaced relation longitudinally of the hopper, the lower open ends of said chute elements each underlying opposite lower open end portions of said troughs whereby to receive material therefrom, said chute elements being of a length to receive material discharged from a plurality of said openings longitudinally outwardly of said troughs, pairs of said chute elements being adjacent troughs defining the legs of inverted generally V-shaped secondary troughs, rigid means interconnecting said troughs to provide a unitary structure, and means for detachably anchoring said unitary structure to the hopper.

3. The structure defined in claim 2 in which said rigid means interconnecting the troughs comprises a rigid bar extending longitudinally of the hopper, said troughs being provided with flanges extending upwardly from one side of each thereof and rigidly secured at their upper ends to said bar.

4. The structure defined in claim 2 in which the means for detachably anchoring said unitary structure to the hopper comprises a pair of hook elements one each on each end of said structure, a pair of longitudinally spaced hook-receiving loops on one side of said hopper, a rigid arm projecting laterally outwardly from one of said troughs, a hook engageable with a portion of the opposite side of said hopper, and a longitudinally adjustable member connecting the front end of said arm and said last mentioned hook.

5. A row crop side dressing attachment for fertilizer spreaders of the type including an elongated hopper extending transversely of the direction of travel and having a plurality of longitudinally spaced discharge openings in its bottom portion, said attachment comprising an open ended inverted generally U-shaped trough the legs of which provide chutes extending generally longitudinally of the hopper and sloping downwardly and outwardly in a vertical plane along the longitudinal dimension of the hopper from the center of the trough to its opposite ends, means for detachably securing said trough to the hopper in underlying relation to the bottom thereof and for limited movements longitudinally thereof, said last-mentioned means comprising a rigid anchoring member on one side of said trough and a longitudinally extensible and retractable anchoring member on the other side of the trough, said anchoring members being engageable with cooperating portions of opposite sides of the hopper and slidable with respect thereto in opposite directions longitudinally of the hopper, said trough being of a length to receive material discharged simultaneously from a plurality of said openings in the bottom of the hopper.

References Cited in the file of this patent

UNITED STATES PATENTS

| Number | Name | Date |
|---|---|---|
| Re. 7,191 | Gorham | June 27, 1876 |
| 1,212,849 | Thompson | Jan. 16, 1917 |
| 1,994,672 | Smith | Mar. 19, 1935 |
| 2,059,548 | Broome | Nov. 3, 1936 |
| 2,180,253 | Moore | Nov. 14, 1939 |

FOREIGN PATENTS

| Number | Country | Date |
|---|---|---|
| 225,864 | Germany | Sept. 23, 1910 |
| 452,098 | Germany | Nov. 5, 1927 |